United States Patent

[11] 3,581,872

| [72] | Inventor | Heinrich Grossjohann<br>Netteberge 67, Bork, Germany |
|---|---|---|
| [21] | Appl. No. | 817,416 |
| [22] | Filed | Apr. 18, 1969 |
| [45] | Patented | June 1, 1971 |
| [32] | Priority | Apr. 20, 1968 |
| [33] | | Germany |
| [31] | | P 17 56 206.0 |

[54] MAGNETIC CONVEYOR APPARATUS
11 Claims, 14 Drawing Figs.

[52] U.S. Cl. .................................. 198/41,
198/183
[51] Int. Cl. .................................. B65g 15/58,
B65g 17/46
[50] Field of Search .......................... 198/30, 41,
183

[56] References Cited
UNITED STATES PATENTS

| 1,157,017 | 10/1915 | Lowe | 198/183X |
| 2,856,058 | 10/1958 | Todd | 198/183X |

FOREIGN PATENTS

| 1,467,164 | 12/1966 | France | 271/74(1) |

*Primary Examiner*—Edward A. Sroka
*Attorney*—Mandeville & Schweitzer

ABSTRACT: A magnetic conveying mechanism for transporting ferromagnetic cylindrical objects is disclosed. The new conveying mechanism includes two parallel endless chains having magnetized bars extending between them. The bars should be spaced a distance apart that is less than the diameter of the articles to be transported. Means for removing the transported articles from the magnetic belt at a point of direction change in the conveying system are also disclosed.

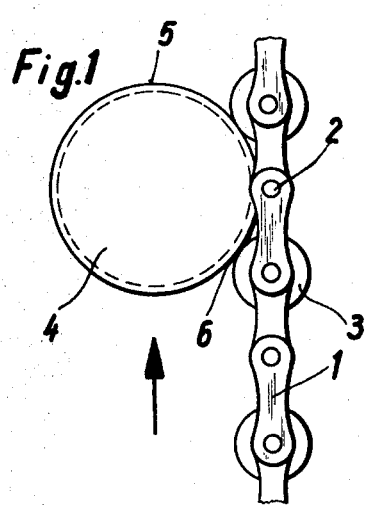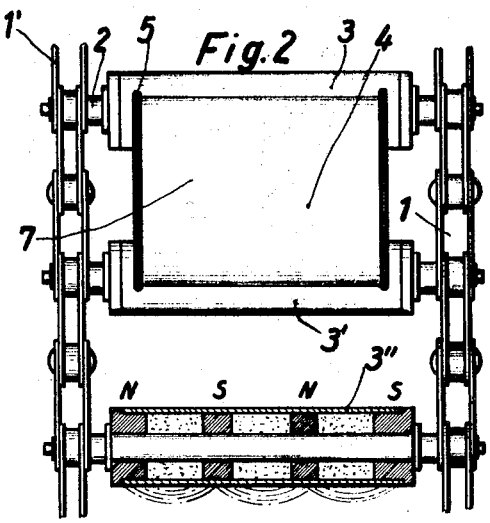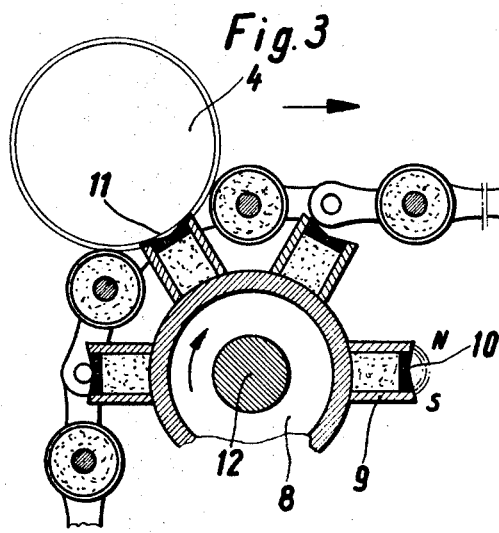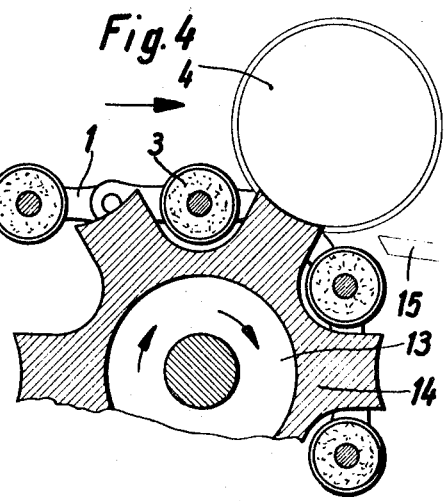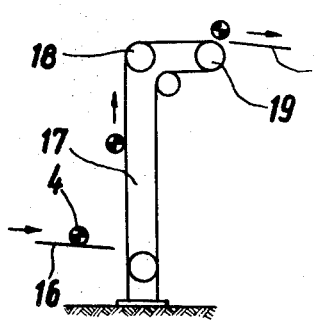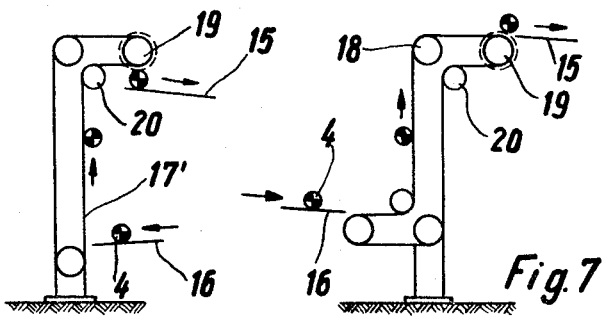

MAGNETIC CONVEYOR APPARATUS

BACKGROUND OF THE INVENTION

The invention relates to a magnetic conveyor apparatus for the transport of ferromagnetic parts, particularly of cylindrically shaped articles like tin cans or the like.

It is known that a conveyor belt can be led over a permanent magnet which will keep the goods to be transported on the belt. However, this prior art device allows only empty cans to be transported unless a special, very expensive conveyor with cam pins or the like is used to prevent the cans from rolling off the belt. Because of the thickness of the conveyor belt, very strong, and therefore expensive, magnets have to be used.

SUMMARY OF THE INVENTION

The primary objectives of this invention are to provide a simple conveying device that protects the material to be transported, conveys empty as well as full cans; is versatile; and has a high conveyor capacity by operating at a high speed.

These objectives are achieved by using two endless chains which run parallel to each other and between which bars are placed a distance apart from one another that is less than the diameter of the cylinder to be transported. In accordance with the invention, at least every second bar should be a permanent magnet, so that the conveyed articles are always resting on two bars and cannot fall off. Sufficient holding forces to retain the articles on the new device are achieved when one of the two bars touching the article is magnetic. Of course, all bars can be magnetized if necessary or desirable to provide an additional degree of holding force. Since most tin cans have slightly protruding ends, it is the protruding ends that touch the bars and not the can itself which usually consists of sensitive and very thin metal.

In accordance with the invention, the endless chains of the new device are themselves conventional chains, the links of which are interconnected by butt joints (fish joints) and the rollers of which are rotatably mounted on pins disposed between the links at points of articulation, whereby the chains may be driven by conventional sprocket wheels. Special cogwheels are disposed between the two endless chains at those points where the chains change direction (bend), the cogs of which wheels mesh with the crossbars attached between the chains.

The cogs on the radial wheel can be adjusted in a radial direction to the size of the cylinders to be transported. In order to provide for additional holding forces for the conveyed articles at direction-changing points, the cogs can be magnetic. Thus, the centrifugal forces arising at high conveyor speed at the points of direction change are effectively nullified. A radial wheel without magnetic cogs can be used to discharge the goods by locating a radial wheel, having cogs long enough to lift the transported material off of the crossbars at the place of discharge. The magnetic crossbars can be polarized in either an axial or radial direction. When polarized radially the antipolar parts of the magnetic bars are opposite.

Another means for discharging the conveyed articles from the new conveyor is the utilization of a magnet that is stronger than that of the crossbars. This removal magnet will pull the conveyed articles off of the magnetic crossbars and on to itself. At a deflection or direction-changing point, the discharging magnet can be shaped as a downward bent plane on, or under which the cylinder can roll off and on to another conveyor.

If a magnetic device is to be placed somewhere else; it is provided in the form of a pivoted (i.e., rotatably mounted) roller near the conveyor at the point from which the goods are to be stripped. The crossbars between the chains do not have to be cylinders. The cross section of the bars can be round, triangular, or square or anything else to suit the purpose of the conveyor. The diameter or size of the crossbars depends largely on the magnetic force that is required.

At a high conveyor speed and/or when heavy material is to be transported, the articles can be conveyed on the inside of a deflection or direction-changing point, whereby the centrifugal force presses the conveyor material even closer to the crossbars so that it cannot fall off of the crossbars. This is made possible through the special arrangement of magnetic crossbars between two chains. Only the chains run over guide wheels at the deflection and thus the space between those chains is open for the conveyance of material.

BRIEF DESCRIPTION OF THE DRAWING

For a better understanding of the present invention and a more complete appreciation of the attendant advantages thereof, reference should be made to the following detailed description taken in conjunction with the accompanying drawings in which FIG. 1 is a partial side view of a conveyor system in accordance with the invention;

FIG. 2 is a partial front view of the apparatus of FIG. 1

FIG. 3 is a cross-sectional view of a change-of-direction mechanism in accordance with the invention;

FIG. 4 is a cross-sectional view of a discharge means in accordance with the invention;

FIGS. 5, 6 and 7 are diagrammatic representations of the conveyor systems of the invention;

Referring to FIGS. 1 and 2 of the drawing, the new conveyor includes two endless roller link chains, 1, and 1', which run parallel to each other. Between the chains 1 and 1' are two cylindrically shaped magnets 3, rotatably mounted on axles extending between parallel inner links of the sprocket chains 1 and 1' (FIG. 2). The magnetic bars 3, one of which is shown in a sectional view on the bottom of FIG. 2, have a permanent magnetic field all around them. Neighboring magnetic bars such as 3' and 3'' in FIG. 2 are polarized in such a way that opposite poles confront each other.

In accordance with the invention, the distance between two magnetic bars is less than the diameter of a cylinder that is to be transported, which, typically is a tin can. With reference to FIGS. 1 and 2, a tin can 4, rests with its hardened rolled edges or chimes 5 on two adjacent bars 3 while being transported. This results in a line of contact 6, at each magnetic bar 3. Bars 3 however do not contact the sensitive wall 7 of the can. The distances between bars 3 are such that the ferromagnetic object 4 locks sufficiently with (i.e., is firmly seated between) the adjacent bars. Thusly, the distance between the center of gravity of the object 4 and the chain area is limited.

Figures 8, 9:
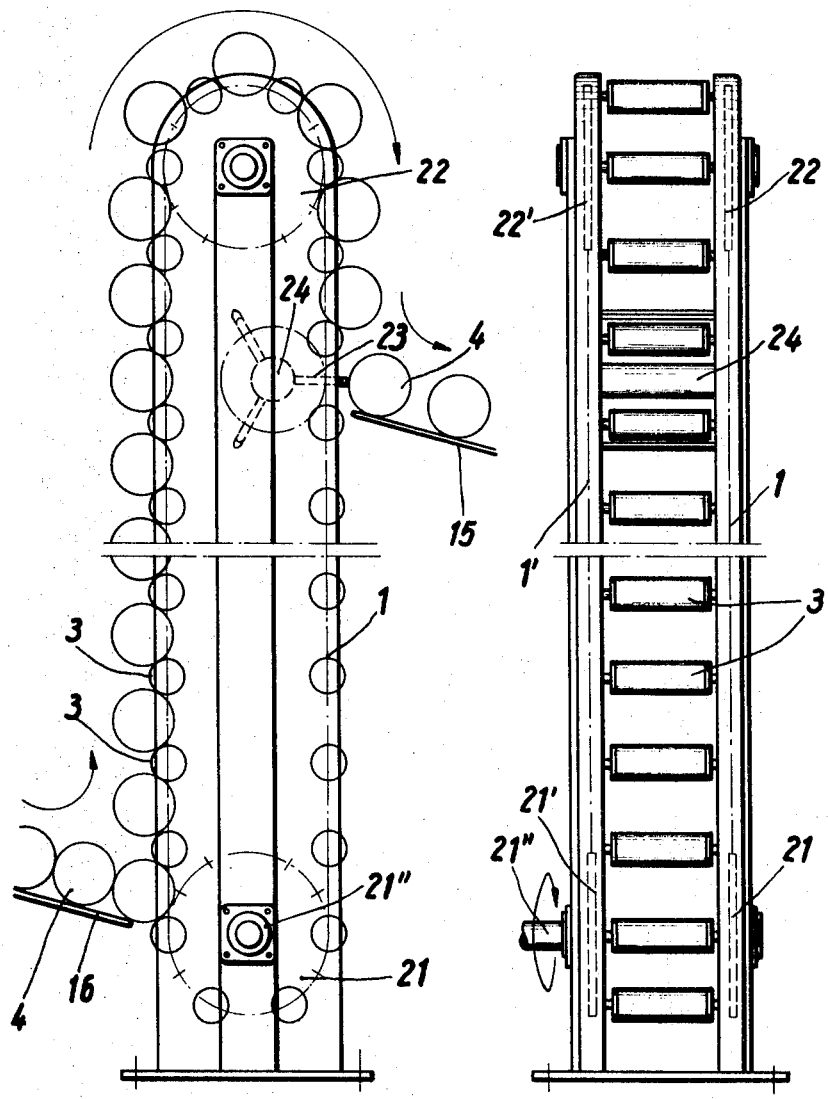
FIG. 8 is a side elevational view of a conveyor system in accordance with the invention.
FIG. 9 is a front elevational view of the apparatus of FIG. 8.

When operated at high speeds, special difficulties arise at the deflections or direction-changing points of the conveyor system because of the centrifugal forces that try to remove the conveyed articles from the chains. The conveyed articles can be kept in place 11, with a radial wheel 8, having magnetic cams or cogs 9, whose frontal areas 10, are magnetic as shown in FIG. 3. The distance between the frontal area 10, and the center 12, of the radial wheel is variable. The cogs or cams 9, of the radial wheel 8, can be of the same width as the magnetic crossbars 3, or narrower.

In order to discharge the transported objects from the bars 3 another radial wheel, 13 as shown in FIG. 4 is used. The cogs or cams 14 of wheel 13 are not magnetic. The cams or cogs 14 mesh with the successive magnetic bars 3. Cams or cogs 14 are longer in their radial direction than cams or cogs 9 in order to disengage the articles 7 from the conveyor bars. In order to adjust to varying diameters of the objects to be transported, these cogs or cams 14 are also adjustable in the radial direction. The can or similar cylindrical object that has been lifted off by the cams or cogs 14 rolls on to a guide plane 15 as shown in FIG. 4.

Normally the conveyor apparatus of the invention is constructed as shown in FIG. 5. The article 4 to be conveyed enters at ramp 16 and is transported on chains 17 up to the deflection 18. It then travels over a short horizontal conveyor part to deflection 19 where it is discharged.

FIG. 6 shows a conveyor for use at very high speeds wherein the conveying chains 17' are on the inside of deflection 20. The article enters at ramp 16, moves upward between chains 17', moves past the sprockets at deflection 20 and to the discharge place 19 where it is discharged on to pickup tray 15 with the help of a radial cogwheel as described in conjunction with FIG. 4.

The chains can also be arranged in such a way that at one deflection the material is transported on the inside of the bend and at the other deflection on the outside. This is shown in FIG. 7.

FIGS. 8 and 9 show a modified conveyor apparatus in accordance with the invention. The apparatus shown therein includes two parallel chains 1 and 1' which run over two sprocket wheels at the bottom 21 and 21', and 22 and 22' at the top. The bottom sprocket wheels 21 and 21' are fixed on a drive shaft 21''. Magnetic bars 3 are located between the chains.

The articles 4, which enter at 16, are moved upwards as shown by the arrows and, after revolving past sprocket wheels 22 and 22' arrive at a radial wheel 23, which serves as a discharge device. Radial wheel 23 whose axle is 24, is disposed between chains 1 and 1' and is driven by one or both chains 1 and 1' through a sprocket wheel (s) mounted on axle 24. The radial outward pointing cogs of radial wheel 23 are of a length sufficient to lift incoming articles 4 off bars 3 and onto pickup tray 15. Since radial wheel 23 is not located equidistantly between the two chains it does not interfere with the cans being transported on the upward moving chains.

Figure 10:
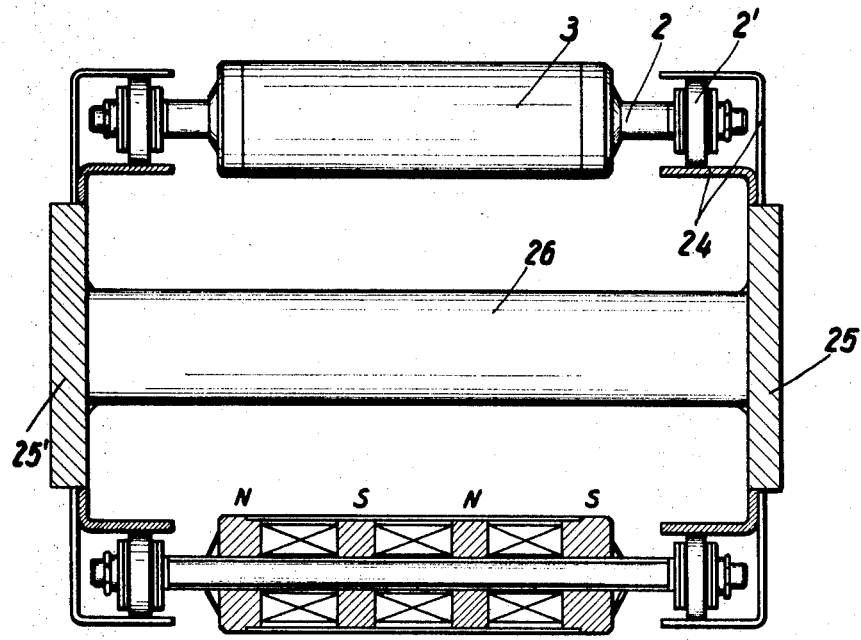
FIG. 10 is a horizontal enlarged cross-sectional view of a portion of the apparatus of FIG. 9.

FIG. 10 is a horizontal sectional view of FIG. 9. Rollers 2' which are pivoted on the axles 2 of magnetic bars 3 are put in the chains. The rollers 2' run in guides 24 which emerge from the ends of a frame consisting of two side vertical members 25 and 25' and cross strut 26.

Figure 11:
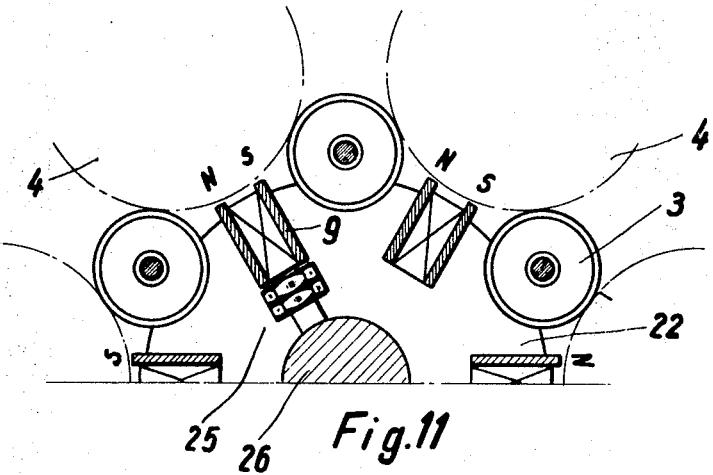
FIG. 11 is a cross-sectional view of a modified version of the deflection mechanism of FIG. 5.

FIG. 11 shows a point of deflection like the one used in the apparatus of FIGS. 8 and 9. A radial wheel 26, whose outward pointing cams or cogs are magnets, is pivoted (i.e., rotatably mounted) between sprocket wheels 22 and 22'. The cogs mesh with the two neighboring magnetic bars 3 and are long enough to exert an additional magnetic force on the articles 4 that may be revolving around the deflection at a high speed. The magnetic cams 9 can be radially adjusted by precision regulators 25 (shown as a pair of hexagonal locking nuts in FIG. 11).

Figures 12, 13:
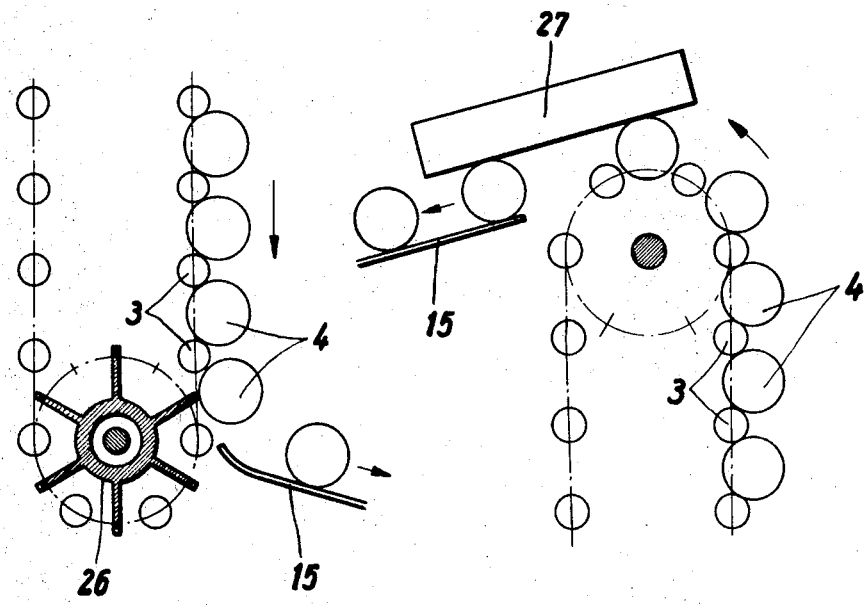
FIGS. 12, 13 and 14 are cross-sectional views depicting alternate means for discharging conveyed articles from the conveyor belt of the invention.

As shown in FIG. 12, the articles discharged can be located at a low deflection. A radial wheel 26 that is located at a low deflection. A radial wheel 26 that is located concentrically to the side sprocket wheels lifts articles 4 off the magnetic bars 3 and onto discharge table 15.

FIG. 13 shows another means for article discharge. A magnet 27 which is stronger than magnetic bars 3 is put near the upper deflection. The oncoming cans 4 are pulled onto magnet 27 and roll off its slanted bottom onto discharge table 15.

Figure 14:
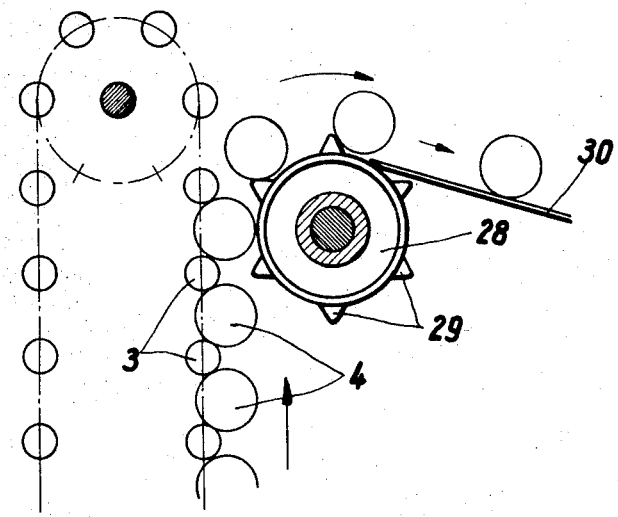

The discharge device in FIG. 14 consists of a magnetic roller 28 whose magnetic force is stronger than that of bars 3. Thus the oncoming articles 4 are taken over by the roller 28.

The roller 28 is in motion and has dogs 29 at its outer circumference. The articles are stripped off at point 30 and taken over for further transportation.

It should be understood, of course, that the apparatus herein illustrated and described is intended to be representative only, as certain changes may be made therein without departing from the clear teachings of the disclosure. Accordingly, reference should be made to the following appended claims in determining the full scope of the invention.

I claim:
1. An endless magnetic conveyor apparatus adapted to transport ferromagnetic cylindrical articles in predetermined paths, comprising
   a. a pair of parallel endless articulated link chains each supported and driven by at least two sprocket means;
   b. a plurality of crossbars extending between said endless chains, at least every other one of which crossbars is permanently magnetized;
   c. said crossbars being spaced such that the distance between adjacent bars is less than the diameter of the articles to be transported, whereby said objects may be seated on and between bars and maintained in said seated relation through the constant magnetic attraction thereof;
   d. whereby said articles may be transported in straight courses and about bends in said conveyor path; and
   e. discharge means adapted to overcome said magnetic attraction to unseat an article being conveyed.
2. The apparatus of claim 1, further including
   a. a radial cogwheel disposed between said chains at a bend in said conveyor path;
   b. said radial cogwheel includes a plurality of radial cogs which mesh with said crossbars as they traverse said bend.
3. The apparatus of claim 2, wherein
   a. said radial cogs include magnetic means and are of sufficient dimension to maintain the seating of an article directly thereupon as the article traverses said bend in the conveyor path.
4. The apparatus of claim 2, wherein
   a. said cogs are adjustable in a radial direction.
5. The apparatus of claim 2, wherein
   a. said cogs project a sufficient distance from the surface of said wheel to dislodge articles supported between said crossbars.
6. The apparatus of claim 1, further including
   a. a discharge magnet for removing conveyed articles from said crossbars;
   b. said discharge magnet having a stronger magnetic force than said crossbars.
7. The apparatus of claim 6, in which the discharge magnet is in the form of a magnetized plane disposed adjacent to said conveyor.
8. The apparatus of claim 1 wherein
   a. said magnetic crossbars are polarized in an axial direction.
9. The apparatus of claim 1 wherein
   a. said magnetic crossbars are polarized in a transverse direction.
10 The apparatus of claim 9, wherein
   a. opposite parts of adjacent magnetic crossbars are polarized in opposite directions.
11. The apparatus of claim 1, wherein
   a. said crossbars are rotatably mounted between said endless chains.